A. C. LINDGREN.
DISK PLOW.
APPLICATION FILED JULY 2, 1914.
1,388,962.
Patented Aug. 30, 1921.
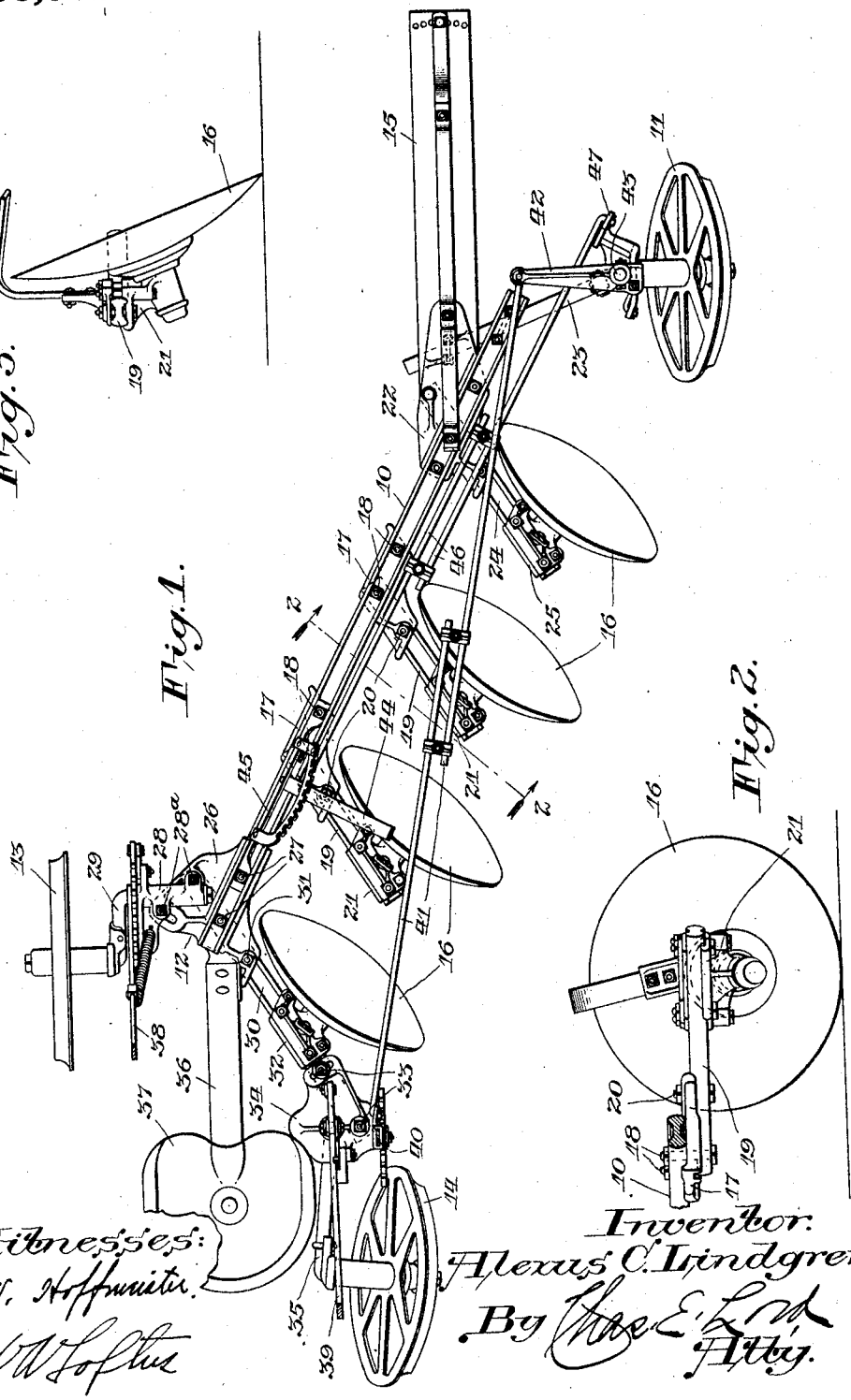

UNITED STATES PATENT OFFICE.

ALEXUS C. LINDGREN, OF CHICAGO, ILLINOIS, ASSIGNOR, BY MESNE ASSIGNMENTS, TO INTERNATIONAL HARVESTER COMPANY, A CORPORATION OF NEW JERSEY.

DISK PLOW.

1,388,962.      Specification of Letters Patent.      Patented Aug. 30, 1921.

Application filed July 2, 1914. Serial No. 848,537.

*To all whom it may concern:*

Be it known that I, ALEXUS C. LINDGREN, a citizen of the United States, residing at Chicago, in the county of Cook and State of Illinois, have invented certain new and useful Improvements in Disk Plows, of which the following is a full, clear, and exact specification.

My invention relates to disk plows.

It is my object to improve and simplify the construction and operation of a device of this character, and this I accomplish by the employment of a frame member to detachably receive disk carrying arms, and having a rear wheel carrying member adjustable thereon in a fore and aft direction so that the number of disks on the plow may be varied, and the rear supporting wheels properly adjusted to conform with the change in a number of disks.

One form which my invention may assume is exemplified in the following description and illustrated in accompanying drawings, in which—

Figure 1 shows a plan view of a disk plow embodying my invention;

Fig. 2 shows a detail sectional view taken on line 2—2 of Fig. 1; and

Fig. 3 shows the rear face view of the disk and associate parts illustrated in Fig. 2.

The particular form of my invention shown herewith comprises a main frame bar 10 arranged at an angle to the line of draft; a front furrow wheel 11; a rear frame member 12 detachably connected to the main frame bar and having a land wheel 13 and a rear furrow wheel 14 attached thereto; draft connections 15, and a series of disks 16 carried upon arms diverging from the frame members.

The main frame bar 10 is preferably formed of I-beam cross-section, and at intervals thereon angle plates 17 are detachably connected beneath the beam by means of bolts 18 which pass through the web, the edges of the plates extending over the flanges of the beam. Each of these angle plates receives a disk carrying arm 19, which is detachably connected thereto by a bolt 20 and one of the bolts 18. The disk carrying arms referred to are also of I-beam construction, and project a short distance in the same direction from the main frame bar. Near the outer end of each, a detachable bracket 21 is secured in place and receives one of the disks 16 before referred to. At the forward end of the frame bar a draft plate 22 is detachably connected and receives the draft connections 15, having connected to it also a supporting arm 23 for the front furrow wheel. This plate 22 is shaped to receive a disk carrying arm 24 similar in construction to the arms 19, and near the outer end of the arm 24 the forward one of the disks 16 is journaled by means of a bracket 25.

The rear frame member 12, before referred to, comprises a central, practically flat, triangular connecting plate 26, which is detachably secured beneath the rear end of the main frame bar by means of two bolts 27, these bolts being spaced the same distance apart as the bolts 18, so that the said plate 26 may be moved to occupy the position of either of the angle plates 17. A bearing 28, adjustably received by bolts 28$^a$, is arranged on one side of the plate 26 to receive a shank 29 for the land wheel 13, and diverging in the opposite direction is a supporting arm 30, which is detachably connected by means of a bolt 31 and one of each of the bolts 27 and 28$^a$ to the plate 26, and occupies the same angle with respect to the main frame bar as do the disk carrying arms 19. This supporting arm has detachably connected to it at a point in line with the brackets 21 and 25 a similar disk carrying bracket 32, which receives in a rotatable manner the rear one of the disks 16. On the outer end of the supporting arm 30 there is mounted in a detachable and adjustable manner, by means of bolts 33, a connecting plate 34, which receives in a slidable manner the vertical portion of a shank 35 carrying the rear furrow wheel 14. Secured also to the plate 26 is a seat support 36 carrying a driver's seat 37.

For adjusting each of the wheels and the frame members I employ the following arrangement of levers: A lever 38 mounted upon the bearing member 28 and connected with the shank 29 for moving the land wheel 13 fore and aft to thereby raise and lower the rear end of the main frame member; and a lever 39 mounted upon the connecting plate 34 and having a connection with the upper end of the vertical portion of the shank 35, for use in elevating the adjacent portion of the rear frame member. Mounted also upon this plate 34 is a second adjusting lever 40 from which there extends in a forward direction a longitudinally adjustable link member 41, having a connection at its forward end with an arm 42 fixed to the upright portion of the shank 43 of the front furrow wheel, said lever being for the purpose of adjusting the wheel 11 in a manner to change its working course in the furrow. For elevating the front portion of the frame I employ an adjusting lever 44 located near the rear end of the frame bar 10 within convenient reach from the driver's seat. This lever 44 has a detachable connection with the frame through the agency of a bracket 45 that is held in place by one of the bolts 27 and one of the bolts 18 in the particular instance illustrated. A link 46 provided also with a longitudinal adjustment extends forwardly from this lever and has a connection with a rocking arm 47, which latter when moved will elevate the frame upon the upright portion of the shank 43 in a well known manner.

It will thus be seen that I have succeeded in arranging all of the adjusting levers in juxtaposition to the driver's seat, and on account of the adjustable connections in the forwardly extended links 41 and 46 the rear frame member 12 can be coupled more closely than at present shown, without interfering with the operation of the lever 40; and the lever 44, owing to its detachable mounting, may be moved forwardly on the main frame to other positions in order to allow for an advanced position of the rear frame member.

In the arrangement just described, when it is desired to shorten the plow, one or more of the disk carrying arms 19 may be removed, and the rear frame 12, comprising the land wheel, rear furrow wheel, rear disk and driver's seat, may be shifted forwardly along the main frame bar to one or the other of the positions occupied on that member by the angle plates 19. The construction shown is capable of use with either two, three or four disks. Obviously, such a frame, by being provided with properly spaced openings, can be made to receive different sized disks, and otherwise adjusted to conform with varying requirements. On account of the angle at which the main frame bar 10 is arranged, representing the line of relative working positions of the disks, and all of the disks being carried in the rear of the hitch devices 15, it is obvious that disks may be removed from or added to the frame without interfering with the evenness of draft of the implement.

It is a distinct advantage in a device of this character to have the positions of the rear carrying wheels adjustable fore and aft on the frame bar, for in this way when fewer disks are being used, by shifting the rear frame 12 forwardly, the weight of the plow will be evenly distributed, and by having the driver's seat and rear disk unitary with the supporting wheels, the position occupied by the driver will always be in close proximity with the working members of the plow, and the adjusting levers being carried on the rear frame member, will at all times occupy the same positions relative to the driver's seat, with the exception, of course, of the lever 44; but which, on account of its detachable mounting, may be readily and easily moved forward to another position on the main frame bar that will be the same relative distance in advance of the seat.

The construction of my plow is a simple and rugged one, and on account of the fact that all of the parts may, by the removal of a few bolts, be quickly detached the device can be readily dismantled for shipping or storing purposes.

While I have shown and described but one form herein it is, nevertheless, to be understood that this plow is susceptible of other modifications, and therefore changes may be employed in the different parts without departing from the spirit of my invention, as disclosed in the appended claims.

What I claim and desire to secure by Letters Patent of the United States is:

1. In a disk plow, a main frame bar, supporting wheels associated therewith, angle plates detachably mounted at intervals beneath said bar, disk carrying arms connected to said angle plates, and a triangular rear plate member detachably secured beneath said frame bar and having a connection with each rear supporting wheel, and securing means for said plates which permit substitution of the rear plate for an angle plate.

2. In a disk plow, supporting wheels, a frame bar arranged at an angle to the line of draft, a front plate member to receive the draft connection, a disk carried by said front plate member, disk carrying arms diverging from said frame bar and detachably mounted thereon, a disk on each of said carrying arms, a rear plate member detachably secured on said frame bar, carrying arms for the rear supporting wheels connected to said rear plate, and a disk mounted on one of said wheel carrying arms, said rear plate member being adapted to be moved forwardly on said frame bar to occupy the position of one or the other of said disk carrying arms.

3. In a disk plow, supporting wheels, a main frame bar of I-beam construction arranged at an angle to the line of draft, angle plates detachably mounted at intervals upon said frame bar, disk carrying arms connected to said angle plates, a disk on each of said arms, and a rear plate member detachably secured to said frame bar, and having a connection with the rear supporting wheels, said rear plate being adapted to be moved forwardly to occupy the position of one or the other of the angle plates.

4. In a disk plow, supporting wheels, a main frame bar formed of I-beam metal arranged at an angle to the line of draft, a front plate member detachably mounted on said frame bar, a draft device having a connection with said front plate member, a disk carrying arm detachably connected to said front plate member, angle plates arranged at intervals and detachably secured on the intermediate portion of said frame bar, disk carrying arms detachably connected to said angle plates, each having a disk carried near its outer end, and a unitary arrangement at the rear of said frame bar comprising a disk, supporting wheels and a seat, said unitary arrangement being detachably connected to the frame bar, and adapted to occupy different positions thereon.

5. In a disk plow, a main frame bar, a front supporting wheel thereon, a rear frame carried by the main bar and adapted for attachment thereto at any one of several positions in its length, a laterally disposed member mounted for horizontal arcuate adjustment on the rear frame and a vertically adjustable rear wheel carried by said member.

6. In a disk plow, a main frame bar, a front supporting wheel thereon, a rear frame carried by the main bar and adapted for attachment thereto at any one of several positions in its length, oppositely disposed members mounted for horizontal arcuate adjustment on the rear frame, and supporting wheels adjustable in bearings on said members.

7. In a disk plow, a main frame, front and rear supporting wheels therefor, a rear frame member carried on the main frame and capable of longitudinal adjustment thereon, said rear frame member having attached to it the rear supporting wheels, adjusting levers for the supporting wheels and for the rear end of the main frame mounted on said rear frame, an adjusting lever detachably received on the main frame and adapted to be moved to different positions thereon, and having a longitudinally adjustable link connection with the forward end of the main frame.

8. The combination of a main frame bar having a horizontal web and vertical flanges, a series of horizontally disposed plates detachably secured to the web and formed with portions resting on the flanges and a plow carrying arm secured to each plate and extending laterally therefrom.

9. The combination of a main frame bar having a horizontal web and vertical flanges, a series of horizontally disposed plates clamped beneath said web and formed with portions extending over the flanges and a plow carrying arm clamped to each member and extending laterally therefrom.

10. The combination of a main frame bar, a frame secured to the rear end of the bar and extending on opposite sides thereof, independently adjustable bearing members mounted on said frame on each side of the bar and a wheel carrying spindle adjustably mounted on each bearing member.

11. In a plow, a main frame, including a diagonal plow carrying member, supporting wheels associated therewith, a plate at the rear end of the diagonal member, carrying arms on each of which is journaled one of said supporting wheels, each arm being mounted to swing on said plate in a horizontal plane, and means for securing said arms in various adjusted positions.

12. The combination of a straight beam, an angular plate mounted on the beam with one outer edge parallel with that of the beam and another transverse thereto and an implement carrying arm mounted on the plate parallel with its transverse edge.

13. The combination of a straight beam, an angular plate mounted on the beam with one outer edge parallel with that of the beam and another transverse thereto, an implement carrying arm mounted on the plate parallel with its transverse edge, and a securing element passed through said beam, plate and arm.

In testimony whereof I affix my signature, in the presence of two witnesses.

ALEXUS C. LINDGREN.

Witnesses:
W. W. LOFTUS,
H. L. LOCKERT.